(12) United States Patent
Katsui et al.

(10) Patent No.: US 6,454,362 B1
(45) Date of Patent: Sep. 24, 2002

(54) METHOD OF CONTROLLING COOLING DEVICE IN PORTABLE ELECTRONIC AND COOLING DEVICE THEREFOR

(75) Inventors: Tadashi Katsui, Kawasaki (JP); Keizo Takemura, Kawasaki (JP); Minoru Hirano, Kawasaki (JP); Masumi Suzuki, Kawasaki (JP); Yoshiaki Udagawa, Kawasaki (JP); Masuo Ohnishi, Kawasaki (JP); Kenichi Fujii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/475,773

(22) Filed: Dec. 30, 1999

(30) Foreign Application Priority Data

Feb. 4, 1999 (JP) ............................................ 11-027645

(51) Int. Cl.⁷ .............................................. H01H 35/14
(52) U.S. Cl. ..................................................... 301/117
(58) Field of Search ................................ 307/117, 112, 307/116; 700/275, 276; 62/3.2, 3.7, 259.2

(56) References Cited

U.S. PATENT DOCUMENTS 5,764,483 A * 6/1998 Ohashi et al.
5,828,549 A * 10/1998 Gandre et al.

FOREIGN PATENT DOCUMENTS

| JP | 02-093673 | * | 7/1990 |
| JP | 06-017294 | * | 3/1994 |
| JP | 07-142886 | * | 6/1995 |
| JP | 07-336904 | * | 12/1995 |
| JP | 09-326580 | * | 12/1997 |
| JP | 10-11176 |   | 1/1998 |
| JP | 10-011176 | * | 1/1998 |
| JP | 10-108052 | * | 4/1998 |

* cited by examiner

Primary Examiner—Edward H. Tso
(74) Attorney, Agent, or Firm—Coudert Brothers LLP

(57) ABSTRACT

A cooling device for a portable electronic comprises a radiation plate and a fin for radiating the heat from the CPU. When the plug of an external power. supply is attached to the body of the portable electronic, the CPU may operate at a high clock frequency. The cooling device achieves a high cooling performance by operating a ventilation fan directed to the fin, for example. When the plug is removed from the body of the portable electronic, the CPU may operate at a low clock frequency. Power consumption can be reduced, so that the electric power stored in the built-in battery can be saved. The duration time of the operation can be extended. Calorific power generated at the CPU can also be reduced, so that the cooling device is adapted to suppress the rise in the temperature of the CPU without operation of the ventilation fan.

16 Claims, 7 Drawing Sheets

METHOD OF CONTROLLING COOLING DEVICE IN PORTABLE ELECTRONIC AND COOLING DEVICE THEREFOR

BACKGROUND OF THE INVENTION

1. Field of the Invention

The present invention relates to a cooling device employed in a portable electronic such as a notebook-sized personal computer or laptop personal computer.

2. Description of the Prior Art

A notebook-sized personal computer in general comprises a built-in battery assembled within its body. As long as the electric power is supplied from the battery, the notebook-sized personal computer keeps operating even when the personal computer cannot receive the electric power from an outlet. In this case, the duration of the operation depends upon the capacity of the battery. If the power consumption at a CPU (central processing unit) can be reduced, the electric power stored in the battery can be saved, so that the duration of the operation may be extended.

The power consumption at a CPU in general depends upon the clock frequency of the CPU. As the clock frequency gets higher, the power consumption gets larger. If the CPU operates at the lower clock frequency, the power consumption can be reduced at the CPU. However, the operation of the CPU may get slower. Accordingly, it is very difficult to satisfy the conflicting demands at the same time, namely, the demand to extend the duration of the operation for the notebook-sized personal computer and the demand to accelerate the operation in the notebook-sized personal computer.

The present inventors have proposed a notebook-sized personal computer comprising a CPU which operates at a low clock frequency when it receives the electric power from a battery and at a high clock frequency when it receives the electric power from an outlet. Accordingly, when the personal computer is used at a place where an outlet is not available, the electric power stored in the battery can be saved, so that it is possible to postpone the termination to the operation of the personal computer. In addition, if the CPU is intended to accelerate its operation, the personal computer may simply be connected to an outlet. The outlet normally keeps supplying the electric power to the personal computer without a limit. The supply of the electric power from the outlet enables the CPU of the personal computer to keep operating at a high processing speed without shortening the duration of the operation.

The variation in the clock frequency of the CPU induces the variation in the calorific power at the CPU in the personal computer of the above-mentioned type. When the CPU operates at a low clock frequency, a low cooling performance may sufficiently suppress an excessive rise in temperature at the CPU. On the other hand, when the CPU operates at a high clock frequency, a higher cooling performance should be achieved to prevent an excessive rise in temperature at the CPU. Heretofore, no cooling device or method of controlling a cooling device has been accomplished to realize the cooling performance variable in response to the variation in the calorific power at the CPU.

SUMMARY OF THE INVENTION

It is accordingly an object of the present invention to provide a method of controlling a cooling device so as to change the cooling performance in response to variation in calorific power. It is also an object of the present invention to provide a cooling device suitable to such method.

According to the present invention, there is provided a method of controlling a cooling device, comprising: determining whether or not a plug of an external power supply is attached to a body of a portable electronic; and changing a cooling performance of the cooling device disposed within the body when a determination indicates attachment of the plug.

The aforementioned method is adapted to assume the variation in the calorific power generated at a power consumption circuit disposed within the body of the portable electronic on the basis of the index whether or not the plug of the stable external power supply is attached to the body of the portable electronic. Intentional change in the cooling performance of the cooling device based on such index may serve to allow the cooling performance to follow the variation in the calorific power generated at the power consumption circuit. In this method, a ventilation fan may be employed in the cooling device so as to change the cooling performance, for example.

In general, the calorific power generated at the power consumption circuit such as a CPU (central processing unit) is considered to follow the amount of power consumption. When the plug is attached or connected to the portable electronic, the stable external power supply is expected to supply the electric power to the portable electronic. A relatively larger electric power is supposed to be consumed in the portable electronic when the portable electronic receives the electric power from the external power supply. However, even when the larger electric power is consumed in the portable electronic, the electric power from the external power supply is hardly exhausted. The high cooling performance of the cooling device based on expectation of a larger calorific power is expected to reliably avoid rise in the temperature within the body of the portable electronic.

The determination may indicate the attachment of the plug when a reception of the plug in a jack is detected. If the connection between the plug and jack, or the reception of the plug in the jack, is detected, the electric power is supposed to be fed from the stable external power supply to the portable electronic. The detection can be realized with a relay switch or a transistor switch, for example. In addition, the reception of the plug may be determined when the electric power supplied from the plug is detected. Such detection may be used to confirm the electric power supplied from the stable external power supply to the portable electronic.

The aforementioned method of controlling may further comprise: setting the cooling performance at a first level when an electric power is supplied from the plug to a power consumption circuit disposed within the body; and setting the cooling performance at a second level lower than the first level when an electric power is supplied to the power consumption circuit from a battery connected to the body. The power consumption circuit assembled in the portable electronic is supposed to consume a relatively larger electric power when the electric power is supplied from the plug and consume a relatively lower electric power when the electric power is supplied from the battery. The larger power consumption is assumed to lead to a larger calorific power generated at the power consumption circuit as compared with a case where the low power consumption is achieved. The achievement of the high cooling performance, specified by the first level, when the larger calorific power is generated at the power consumption circuit, is expected to reliably avoid a rise in the temperature within the body of the portable electronic.

In addition, the aforementioned method of controlling may further comprise: setting the cooling performance at a first level when a clock frequency of a power consumption circuit is set at a first frequency; and setting the cooling performance at a second level lower than the first level when the clock frequency of the power consumption circuit is set at a second frequency lower than the first frequency. The power consumption circuit such as a CPU is normally supposed to generate a larger calorific power when the CPU operates at a higher clock frequency. The achievement of the high cooling performance, specified by the first level, when the larger calorific power is generated at the power consumption circuit, is expected to reliably avoid rise in the temperature within the body of the portable electronic. In this condition, it is preferable to set the clock frequency at the first frequency when the electric power is supplied from the plug to the portable electronic and at the second frequency when the electric power is supplied from the battery to the portable electronic.

The cooling performance may be changed over from the second level to the first level when a temperature detected within the body reaches a threshold temperature level. It is accordingly possible to avoid rise in the temperature with the high cooling performance specified by the first level even when the low cooling performance specified by the second level cannot restrain rise in the temperature enough.

In setting the cooling performance at the first level, a ventilation fan may be operated to direct airflow toward a fin receiving heat transmission from the power consumption circuit. The power consumption circuit is supposed to receive the electric power from the plug as describe above when the first level is established. The electric power from the stable external power supply is hardly exhausted, so that the power consumption at the ventilation fan fails to affect on the electric power supplied to the power consumption circuit.

In setting the cooling performance at the second level, a radiation plate may be employed to radiate heat of the power consumption circuit. The power consumption circuit is supposed to receive the electric power from the battery as described above when the second level is established. Employment of the radiation plate serves to efficiently radiate heat without consuming the electric power, so that it is possible to restrain rise in the temperature without exhausting the electric power stored in the battery.

When achieving the aforementioned method, a portable electronic may comprise: a body; a cooling device disposed within the body; and a control circuit capable of changing a cooling performance of the cooling device when a plug of an external power supply is attached to the body.

The control circuit serves to change the cooling performance of the cooling device in accordance with the index whether or not the plug is attached to the portable electronic. When the portable electronic receives an enough electric power from the stable external power supply, for example, the cooling device is intended to achieve the high cooling performance in response to the supplied electric power. Even when the larger electric power is consumed at the cooling device, the electric power from the stable external power supply is hardly exhausted. On the other hand, when a limited amount of the electric power is supplied from the battery, the power consumption can be reduced at the cooling device, so that the electric power stored in the battery can be saved. The changeover of the cooling performance may be achieved with employment of a ventilation fan, for example.

The cooling device may include a fin receiving heat transmitted from a power consumption circuit, and a ventilation fan capable of changing an amount of airflow directed to the fin. Such cooling device is adapted to increase the amount of airflow from the ventilation fan when the attachment of the plug is confirmed. On the other hand, when the plug is removed, the ventilation fan may reduce the amount of airflow. The cooling device may achieve a high cooling performance in response to the increase of the supplied electric power when the cooling device receives a sufficient amount of the electric power from the stable external power supply. Even when the larger electric power is consumed at the ventilation fan, the electric power from the stable external power supply is hardly exhausted. On the other hand, when a limited amount of the electric power is supplied from the battery, the power consumption can be reduced at the ventilation fan, so that the electric power stored in the battery can be saved.

The cooling device may further include a radiation plate radiating heat generated at the power consumption circuit. The radiation plate serves to efficiently radiate heat of the power consumption circuit without consuming the electric power. Accordingly, the radiation plate may contribute to restraint of rise in temperature without inducing the exhaustion of the electric power.

A cooling device suitable to the aforementioned control may comprise: a radiation plate disposed within a body of the portable electronic so as to radiate heat from a high temperature component; a fin disposed within the body of the portable electronic so as to receive heat from the high temperature component; and a ventilation fan disposed within the body of the portable electronic so as to generate airflow directed to the fin.

The above-described cooling device may achieve a first cooling performance with the radiation from the radiation plate and a second cooling performance with the employment of the fin and the ventilation fan in addition to the radiation plate. Moreover, the radiation plate may serve to maintain the minimum cooling performance without consuming the electric power, thereby contributing to reducing the power consumption at the ventilation fan to the utmost.

The fin preferably faces an opening defined in a housing of the body. The airflow from the ventilation fan is allowed to flow out of the body of the portable electronic through the opening after absorbing the heat of the fin. The airflow heated by the fin hardly remains within the body of the portable electronic, so that rise in the temperature may efficiently be avoided within the body of the portable.

A heat conduction component is preferably disposed between the radiation plate and the fin for distributing heat from the high temperature component to the radiation plate and the fin. The heat conduction component may serve to reliably spread the heat from the high temperature component or power consumption circuit over the radiation plate and the fin. The heat conduction component may be a heat pipe. The heat pipe may comprise a container such as a vacuumed metallic tube airtightly enclosing a volatile fluid such as water.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
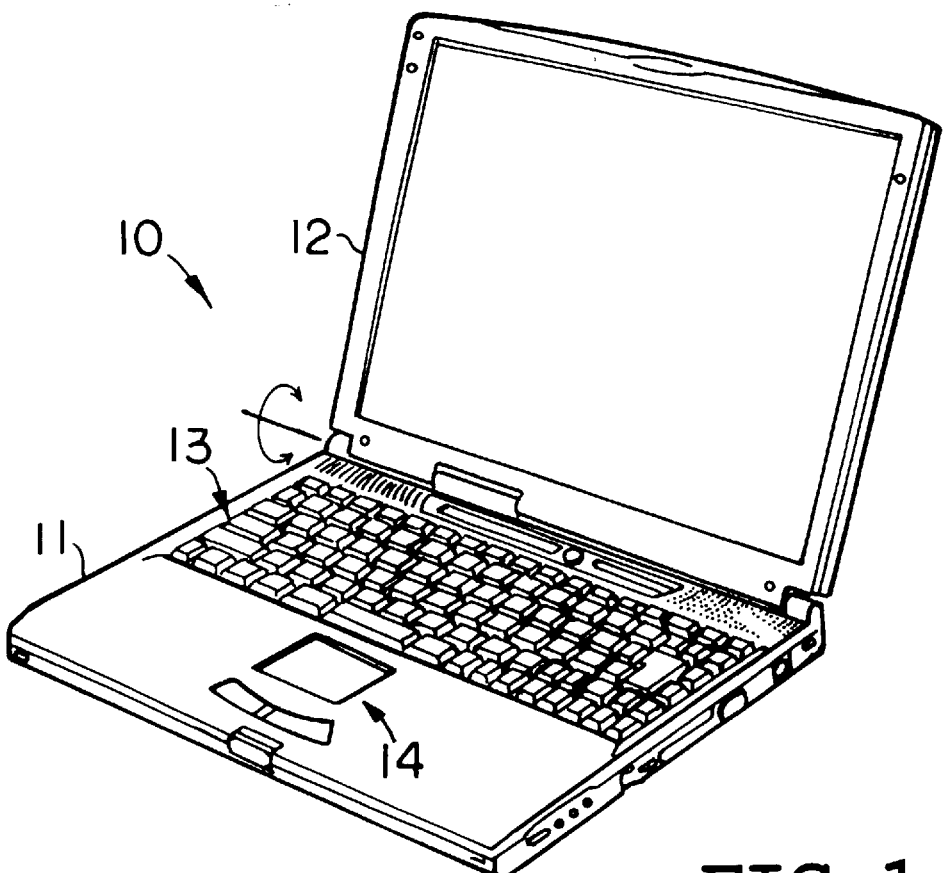
FIG. 1 is a perspective view illustrating an entire structure of a notebook-sized personal computer with a lid opened.

FIG. 1 illustrates an exterior appearance of a notebook-sized personal computer 10 as an example of a portable electronic. The personal computer 10 comprises a body 11 containing circuit boards and components including a central processing unit (CPU), and a lid 12 connected to the body 11. A liquid crystal display (LCD) is embedded in the body 11. When a user allows the CPU to process an installed software in the body 11, the user may input any instructions or information data through a keyboard 13 and/or a pointing device 14 assembled in the body 11. The result of the processing can be displayed on the LCD in the lid 12.

The lid 12 is capable of swinging about the support axis with respect to the body 11. The swinging movement of the lid 12 allows the surface of the LCD to be superposed on the body 11 at the closed position.

Figure 2:
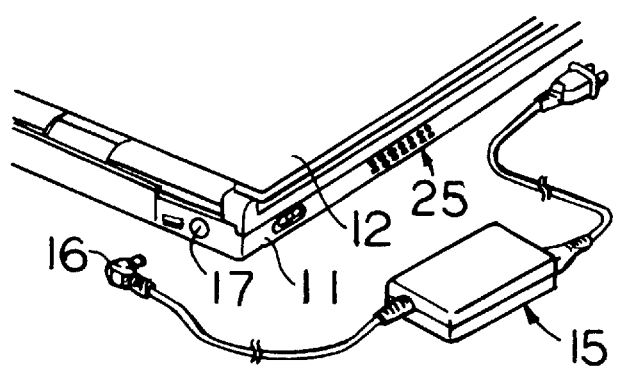
FIG. 2 is a perspective view illustrating a corner of the back of the notebook-sized personal computer with the lid closed.

As is apparent from FIG. 2, an AC adapter 15 may be connected to the body 11. The AC adapter 15 serves to convert the alternating current received from an external power supply such as an outlet, not shown, to the direct current. When a plug 16 of the AC adapter 15 is received in a jack 17 embedded in the body 11, the direct current after conversion can be supplied to the circuit boards and components in the body 11.

Figure 3:
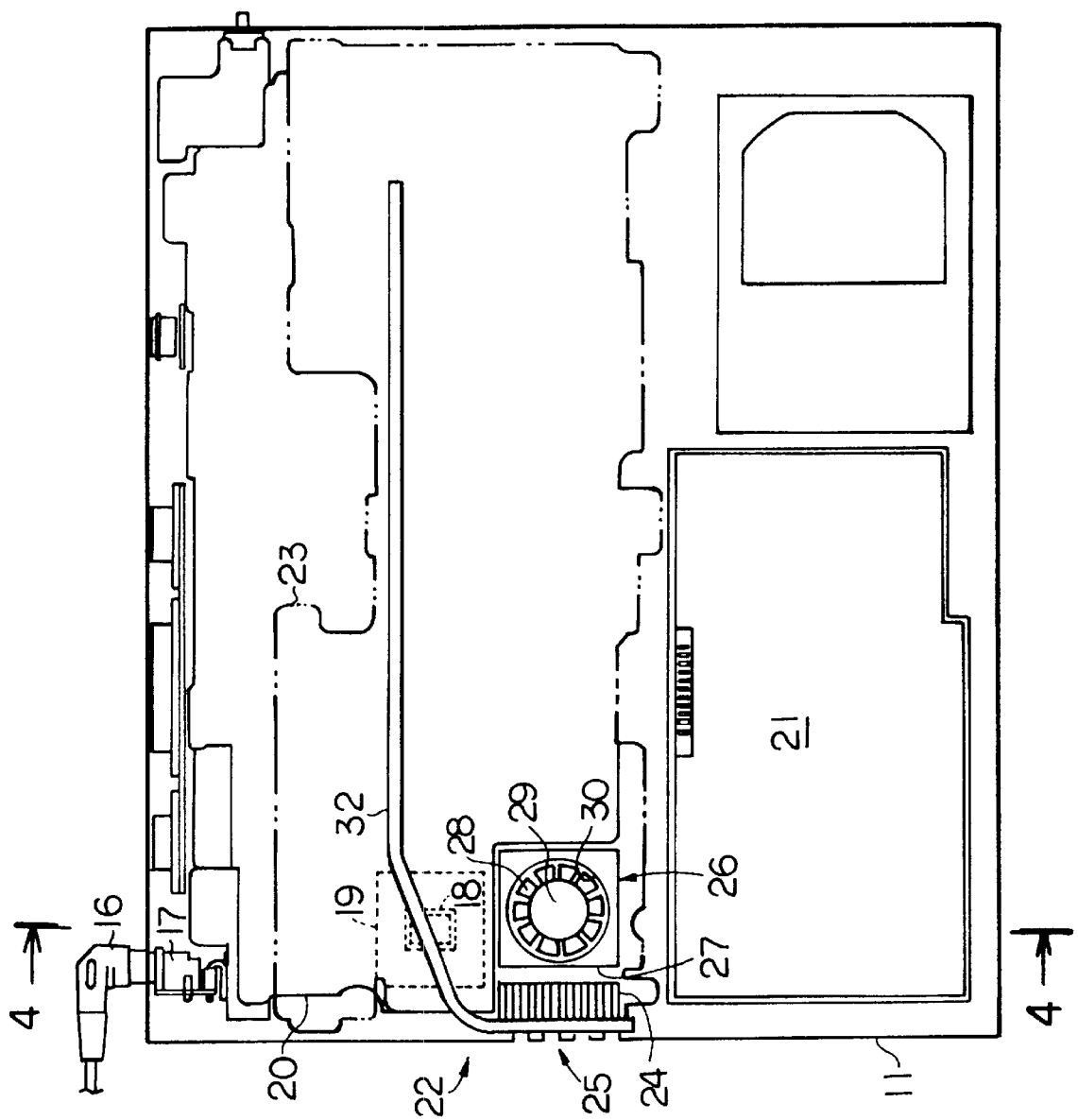
FIG. 3 is a plan view schematically illustrating the inner structure of the notebook-sized personal computer.

FIG. 3 schematically illustrates the interior structure of the body 11. The body 11 includes a printed circuit board or motherboard 20. A package 19 including the CPU 18 is mounted on the surface of the printed circuit board 20. The plug 16 received in the jack 17 electrically leads to the CPU 18 in the package 19 so as to supply the electric power or voltage to the CPU 18. A secondary battery or cell 21 assembled within the body 11 is also electrically connected to the CPU 18 so as to supply the electric power or voltage to the CPU 18. The CPU 18 operates by the supplied electric power or voltage.

A cooling device 22 is connected to the CPU 18. The cooling device 22 comprises a radiation plate (or a plurality of radiation plates) 23 made of a metallic plate such as an aluminum plate of high heat conductivity, and a fin 24 formed of an aluminum plate or a plurality of spaced aluminum plates. The radiation plate 23 extends fully widthwise or in the lateral direction so as to cover over the printed circuit board 20 with the package 19 of the CPU 18 mounted thereon. The fin 24 is positioned to face an opening 25 defined in the housing of the body 11, referring also to FIG. 2.

A ventilation fan 26 generates airflow directed to the fin 24. The ventilation fan 26 includes a ventilation opening 27 opposed to the fin 24. The ventilation opening 27 serves to direct airflow to the fin 24. The ventilation fan 26 comprises a rotor 29 with a plurality of blades 28. When the rotor 29 receives the electric power to rotate, air is sucked through an introduction window 30 opposed to the radiation plate 23. The sucked air is allowed to flow out of the ventilation opening 27. The airflow running out of the ventilation opening 27 escapes out of the housing through the opening 25 after absorbing the heat of the fin 24. The cooling performance is allowed to vary in accordance with the amount of electric power consumed at the ventilation fan 26 in the cooling device 22 of this type.

Figure 4:
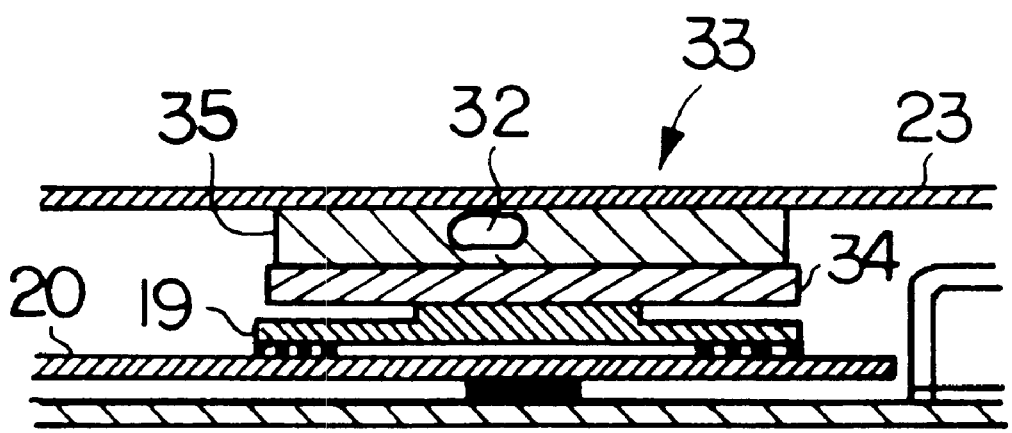
FIG. 4 partially illustrates a sectional view taken along the line 4—4 in FIG. 3.
Figure 5:
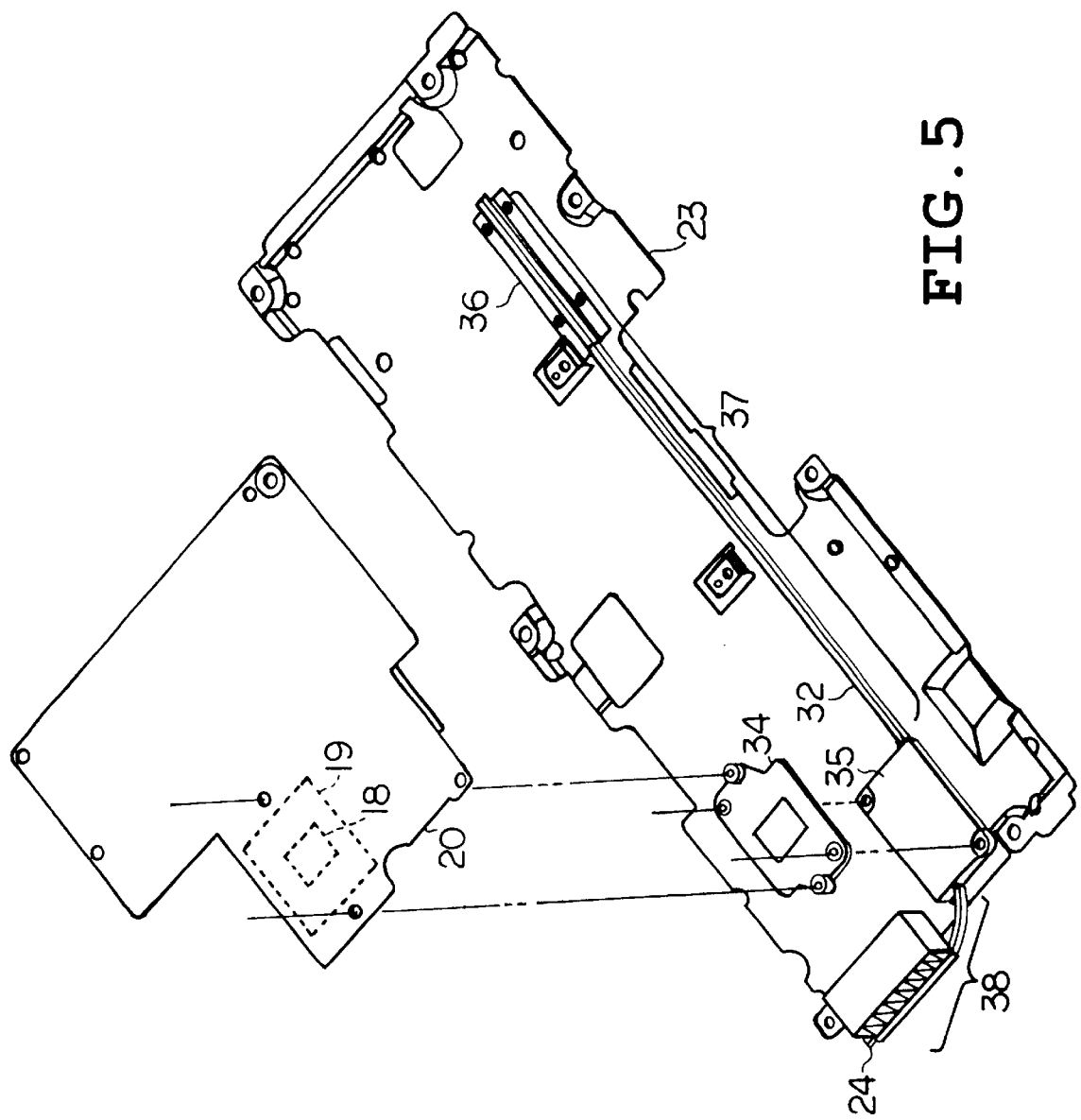
FIG. 5 is an exploded view illustrating the reverse faces of a radiation plate and a printed circuit board.

A heat distribution system 33 is disposed between the CPU 18 and the radiation plate 23 as well as the fin 24 for distributing the heat from the CPU 18, as a high temperature component, to the radiation plate 23 and the fin 24 by using a heat pipe 32. The heat distribution system 33 further comprises, as shown in FIGS. 4 and 5 for example, a heat diffusion plate 34 directly contacting the CPU 18 in the package 19, and a metallic block 35 superposed on the heat diffusion plate 34. The heat pipe 32 penetrates through the metallic block 35. The heat diffusion plate 34 first absorbs the heat of the CPU 18. The absorbed heat is then transmitted to the heat pipe 32 through the metallic block 35.

The metallic block 35 with the assistance of an attachment 36 serves to fix the heat pipe 32 at the reverse face of the radiation plate 23, as shown in FIG. 5. Such fixation of the heat pipe 32 to the radiation plate 36 allows the heat pipe 32 to evenly contact with the radiation plate 23 at an overall length along a first heat conductive path 37 extending in one direction from the metallic block 35. The heat transmitted from the metallic block 35 is allowed to evenly spread over the radiation plate 23. The heat pipe 32 contacts with the respective aluminum plates of the fin 24 in a second heat conductive path 38 extending in the other direction or opposite direction from the metallic block 35. The heat transmitted from the metallic block 35 is allowed to evenly spread over the fin 24. The heat pipe 32 may conventionally comprise a container such as a vacuumed metallic tube airtightly enclosing a volatile fluid such as water. The heat distribution system 33 may employ a plurality of heat pipes, or a heat conduction component other than a heat pipe.

Figure 6:
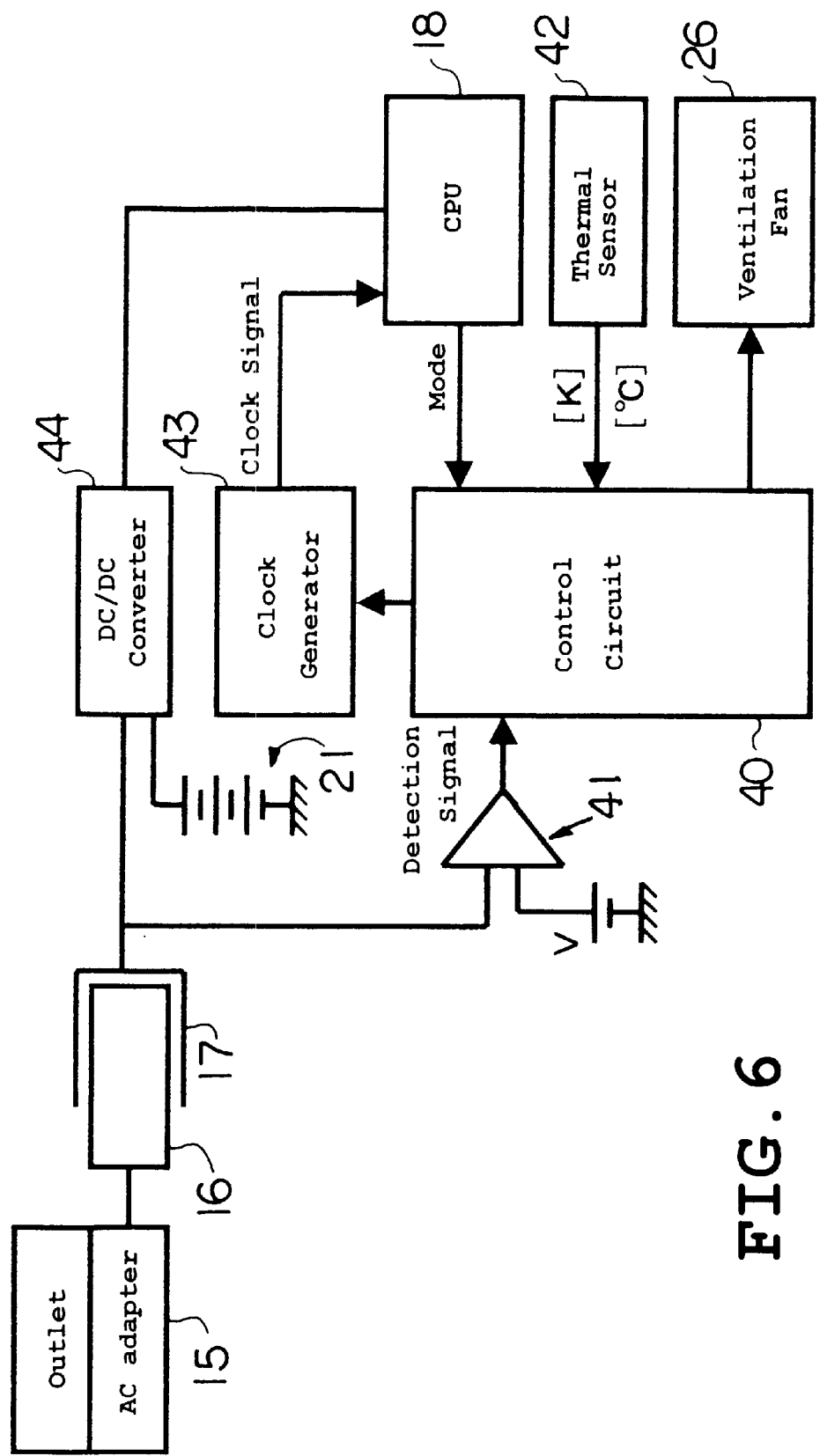
FIG. 6 is a block diagram schematically illustrating a control system to a cooling device.

FIG. 6 schematically illustrates a control system of the cooling device 22. The control system comprises a control circuit 40 capable of switching over the cooling performance of the cooling device 22 between a first level and a second level lower than the first level. When the cooling performance is set at the first level, the control circuit 40 serves to supply the electric voltage to the ventilation fan 26 so as to activate the ventilation fan 26. The heat of the CPU 18 is simultaneously radiated through the radiation plate 23 and the fin 24 in the cooling device 22. When the cooling performance is set at the second level, the control circuit 40 serves to restrain the supply of the electric voltage to the ventilation fan 26 so as to keep the ventilation fan 26 at rest. The cooling performance of the cooling device 22 depends upon the surface area of the radiation plate 23. The control circuit 40 may be realized by a microprocessor unit (MPU) programmable with a firmware, for example.

The control circuit 40 can be switched over between a performance mode and a silence mode. When the performance mode is established, the control circuit 40 is prepared to activate the ventilation fan 26. On the other hand, when the silence mode is established, the control circuit 40 serves to keep the ventilation fan 26 at rest. The CPU 18 instructs the changeover between the performance mode and the silence mode for the control circuit 40. The user may intentionally select any of the performance and silence modes through the manipulation to the keyboard 13 and/or the pointing device 14.

A detection circuit 41 is connected to the control circuit 40 for outputting a detection signal when the plug 16 is received in the jack 17. A thermal sensor 42 is also connected to the control circuit 40 for detecting the temperature around the CPU 18. The detection circuit 41 may comprise a comparator element which outputs the detection signal when the voltage supplied from the plug 16 exceeds a predetermined level V, for example. The thermal sensor 42 serves to output a signal indicating the temperature of the Celsius scale or the Kelvin scale, for example.

A clock generator 43 serves to output a clock signal for determining the clock frequency of the CPU 18. The clock signal can be changed over between a first frequency and a second frequency lower than the first frequency. When the first frequency is set to the clock signal, the CPU 18 is allowed to operate at a high speed with a high calorific power. When the second frequency is set to the clock signal, the CPU 18 generates a lower calorific power with a lower operation speed. The instructions from the control circuit 40 serves to determine the frequency of the clock signal, namely, the clock frequency of the CPU 18

The CPU 18 receives the direct current voltage from a DC/DC converter 44 when the CPU 18 operates. The DC/DC converter 44 serves to transform the direct current voltage, supplied from the plug 16 and the second battery 21, to a voltage suitable to the CPU 18.

Figure 7:
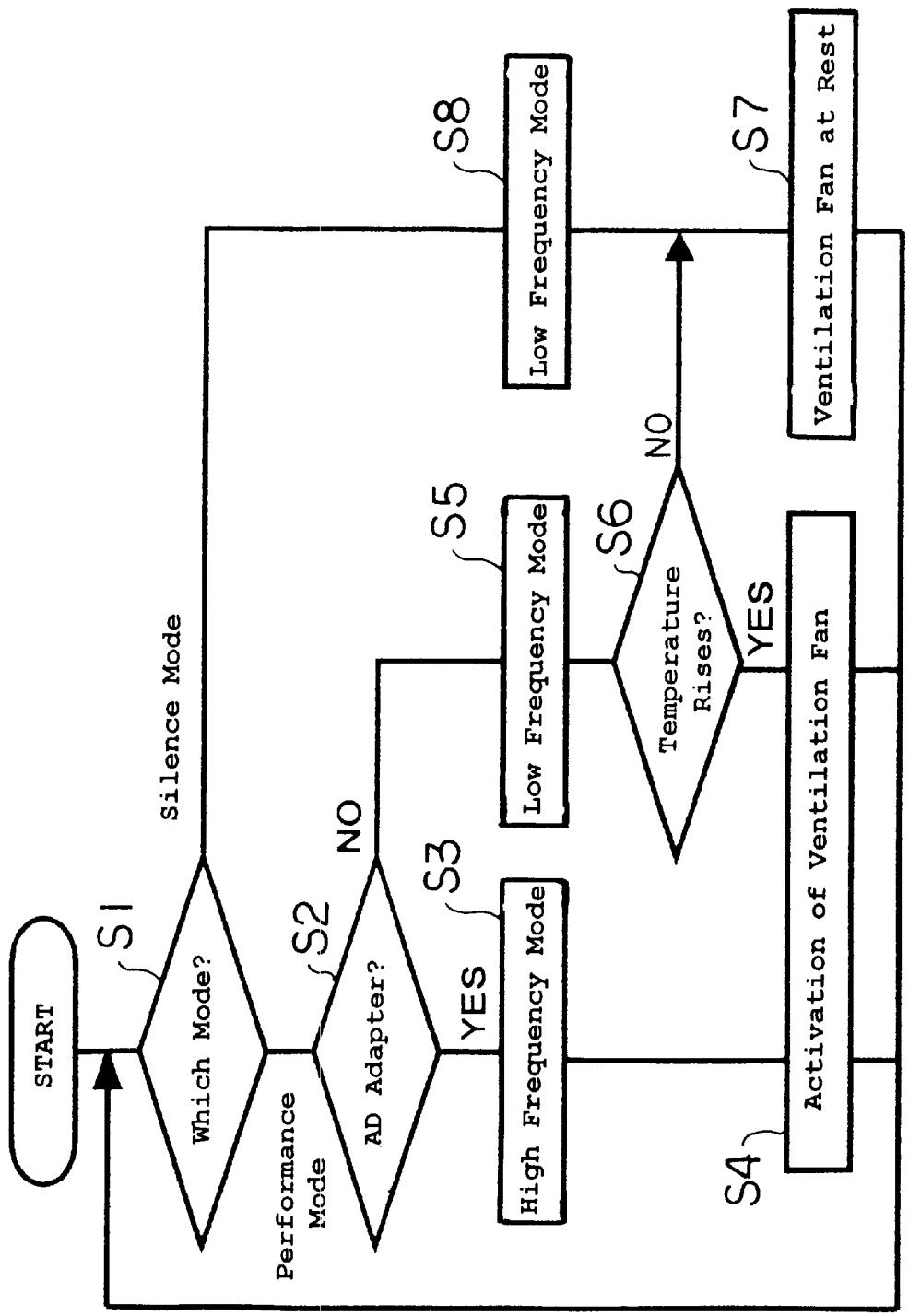
FIG. 7 is a flowchart illustrating the method of controlling the cooling device.

Next, the description will be made on the operation of the control circuit 40 referring to a flowchart shown in FIG. 7. When the notebook-sized personal computer 10 is booted, the control circuit 40 judges at step S1 which mode has been selected. When the control circuit 40 determines the designation of the performance mode, the control circuit 40 then determines at step S2 whether or not the plug 16 is attached to or received in the jack 17 embedded in the body 11. If the detection signal is supplied from the detection circuit 41, the control circuit 40 confirms the attachment of the plug 16 to the body 11. Since the electric power is supplied to the body 11 from an outlet through the plug 16, the user is allowed to use the notebook-sized personal computer 10 without concern for exhaustion of the supplied electric power. The control circuit 40 then sets at step S3 the frequency of the clock signal, which is generated at the clock generator 43, at the first frequency. The high frequency mode has accordingly been established in the CPU 18. The CPU 18 processes a software at the maximum processing speed.

The control circuit 40 is adapted to activate the ventilation fan 26 at step S4. The heat from the CPU 18 can be radiated from both the radiation plate 23 and the fin 24. The cooling device 22 achieves a high cooling performance as specified by the first level. The heat from the CPU 18 can be efficiently radiated so that rise in temperature around the CPU 18 can be avoided. Since the notebook-sized personal computer 10 receives the electric power from an outlet through the plug 16, the operation of the ventilation fan 26 fails to cause exhaustion of the electric power supplied to the CPU 18. The user may keep operating the notebook-sized personal computer 10 without concern about termination to the supply of the electric power.

If the control circuit 40 determines the removal of the plug 16 from the body 11 at step S2, the control circuit 40 sets at step S5 the frequency of the clock signal, which is generated at the clock generator 43, at the second frequency. The low frequency mode has accordingly been established in the CPU 18. The CPU 18 receives the electric power only from the secondary battery 21. No electric power is supplied from the plug 18 to the CPU 18. The electric power consumed at the CPU 18 directly affects on the duration of the supplied electric power from the second battery 21. A drop in the clock frequency to the CPU 18 enables the saving of the electric power stored in the second battery 21, so that the duration of the operation of the CPU 18 can be extended.

During the operation of the CPU 18, the control circuit 40 keeps receiving the signal indicating the temperature around the CPU 18 from the thermal sensor 42. The control circuit 40 compares at step S6 the temperature detected at the thermal sensor 42 and a predetermined threshold temperature level. The threshold temperature level can be set in view of temperature permissible to electronic elements and components in the vicinity of the CPU 18.

When the temperature detected at the CPU 18 fails to reach the threshold temperature level, the control circuit 40 keeps the ventilation fan 26 at rest at step S7. The cooling performance is set at the second level in the cooling device 22. Since the drop in the clock frequency to the CPU 18 serves to restrain the calorific power generated at the CPU 18 in the low frequency mode, the low cooling performance may sufficiently suppress rise in the temperature around the CPU 18. In addition, no operation leads to no consumption of the electric power at the ventilation fan 26, contributing to saving the electronic power stored in the second battery 21. The cooling device 22 achieves enough cooling performance without accelerating the exhaustion of the electric power stored in the second battery 21.

When the temperature detected at the CPU 18 reaches the threshold temperature level, the procedure goes to step S4 where the control circuit 40 activates the ventilation fan 26. The cooling device 22 achieves the higher cooling performance as defined by the aforementioned first level. The heat from the CPU 18 can efficiently be radiated, so that the temperature can drop around the CPU 18. The operation of electronic elements and components can be guaranteed in the vicinity of the CPU 18. For example, if the radiation plate 23 provides a surface area enough to radiate the heat from the CPU 18 operating at the second frequency lower than the first frequency, the temperature around the CPU 18 can be avoided from exceeding the threshold temperature level. However, in case where the atmospheric temperature serves to raise the temperature around the CPU 18 beyond expectation, the operation of the ventilation fan 26 contributes to dropping the temperature around the CPU 18. The intermittent operation of the ventilation fan 26 in this manner may contribute to reduction in the consumption of the electric power at the ventilation fan 26, as compared with the constant operation of the ventilation fan 26.

When the control circuit 40 confirms the designation of the silence mode at step S1, the control circuit 40 then sets at step S8 the frequency of the clock signal, which is generated at the clock generator 43, at the second frequency. The low frequency mode has accordingly been established in the CPU 18. The CPU 18 operates at the low processing speed, with the calorific power restrained. The control circuit 40 keeps the ventilation fan 26 at rest at step S7. The cooling performance is set at the second level in the cooling device 22. Since the drop in the clock frequency to the CPU 18 serves to restrain the calorific power generated at the CPU 18, the low cooling performance may sufficiently suppress rise in the temperature around the CPU 18.

The ventilation fan 26 is maintained at rest in the silence mode irrespective of the supply of the electric power through the plug 16. No operation of the ventilation fan 26, namely, no rotation of the rotor 28 fails to induce noise. Accordingly, the user keeps operating the notebook-sized personal computer 10 with less noise leaking out of the body 11.

The management of the control circuit 40 in the above manner is preferably realized at intervals during the operation of the notebook-sized personal computer 10. Constant monitor of the attachment of the plug 16 and variation in temperature around the CPU 18 allows the cooling device 22 to dynamically change its cooling performance in response to variation in the condition of the CPU 18.

Figure 8:
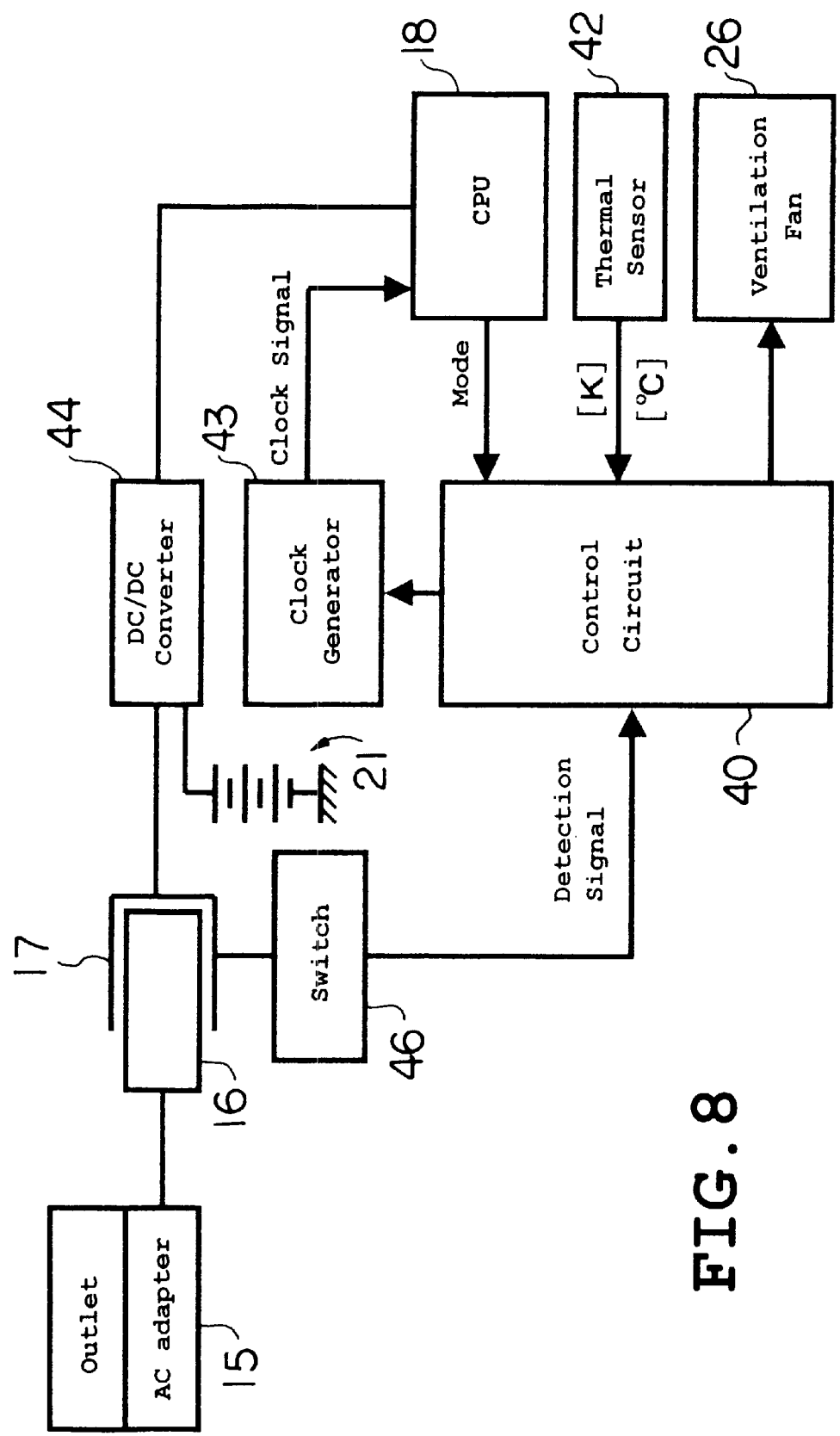
FIG. 8 is a block diagram illustrating another embodiment to the detection circuit.

The detection signal supplied to the control circuit 40 may be generated, as shown in FIG. 8, for example, at a switch 46 for detecting a physical contact between the plug 16 and the jack 17. The switch 46 may employ a relay switch or a transistor switch, for example.

It should be noted that the cooling device 22 may change its cooling performance not only by turning on and off the ventilation fan 26 as described above but also by changing revolution speed of the ventilation fan 26 to high and low revolution speeds.

What is claimed is:

1. A method of controlling a cooling device, comprising:
   determining whether or not a plug of an external power supply is attached to a body of a portable electronic; and
   changing a cooling performance of the cooling device disposed within the body when a determination indicates attachment of the plug.

2. The method of controlling as defined in claim 1, wherein a ventilation fan is employed in the cooling device so as to change the cooling performance.

3. The method of controlling as defined in claim 1, wherein the determination indicates the attachment of the plug when a reception of the plug in a jack is detected.

4. The method of controlling as defined in claim 3, wherein the reception of the plug is determined when an electric power supplied from the plug is detected.

5. The method of controlling as defined in claim 3, further comprising:
   setting the cooling performance at a first level when an electric power is supplied from the plug to a power consumption circuit disposed within the body; and
   setting the cooling performance at a second level lower than the first level when an electric power is supplied to the power consumption circuit from a battery connected to the body.

6. The method of controlling as defined in claim 5, wherein the cooling performance is switched from the second level to the first level when a temperature detected within the body reaches a threshold temperature level.

7. The method of controlling as defined in claim 5, wherein a ventilation fan is operated to direct airflow toward a fin receiving heat transmission from the power consumption circuit when the cooling performance is set at the first level.

8. The method of controlling as defined in claim 7, wherein a radiation plate is employed to radiate heat of the power consumption circuit when the cooling performance is set at the second level.

9. The method of controlling as defined in claim 3, further comprising:
   setting the cooling performance at a first level when a clock frequency of a power consumption circuit is set at a first frequency; and
   setting the cooling performance at a second level lower than the first level when the clock frequency of the power consumption circuit is set at a second frequency lower than the first frequency.

10. The method of controlling as defined in claim 9, wherein the cooling performance is switched from the second level to the first level when a temperature detected within the body reaches a threshold temperature level.

11. The method of controlling as defined in claim 9, wherein a ventilation fan is operated to direct airflow toward a fin receiving heat transmission from the power consumption circuit when the cooling performance is set at the first level.

12. The method of controlling as defined in claim 11, wherein a radiation plate is employed to radiate heat of the power consumption circuit when the cooling performance is set at the second level.

13. A portable electronic comprising:
   a body;
   a cooling device disposed within the body; and
   a control circuit capable of changing a cooling performance of the cooling device when a plug of an external power supply is attached to the body.

14. The portable electronic as defined in claim 13, wherein the cooling device includes a ventilation fan employed to change the cooling performance.

15. The portable electronic as defined in claim 13, wherein the cooling device includes a fin receiving heat transmitted from a power consumption circuit, and a ventilation fan capable of changing an amount of airflow directed to the fin.

16. The portable electronic as defined in claim 15, wherein the cooling device further includes a radiation plate radiating heat generated at the power consumption circuit.

* * * * *